March 17, 1936. W. W. SCHROEDER 2,034,272
CONTROL MECHANISM FOR VARIABLE VOLUME COMPRESSORS
Filed Aug. 7, 1930
Fig. 1.
Fig. 2.
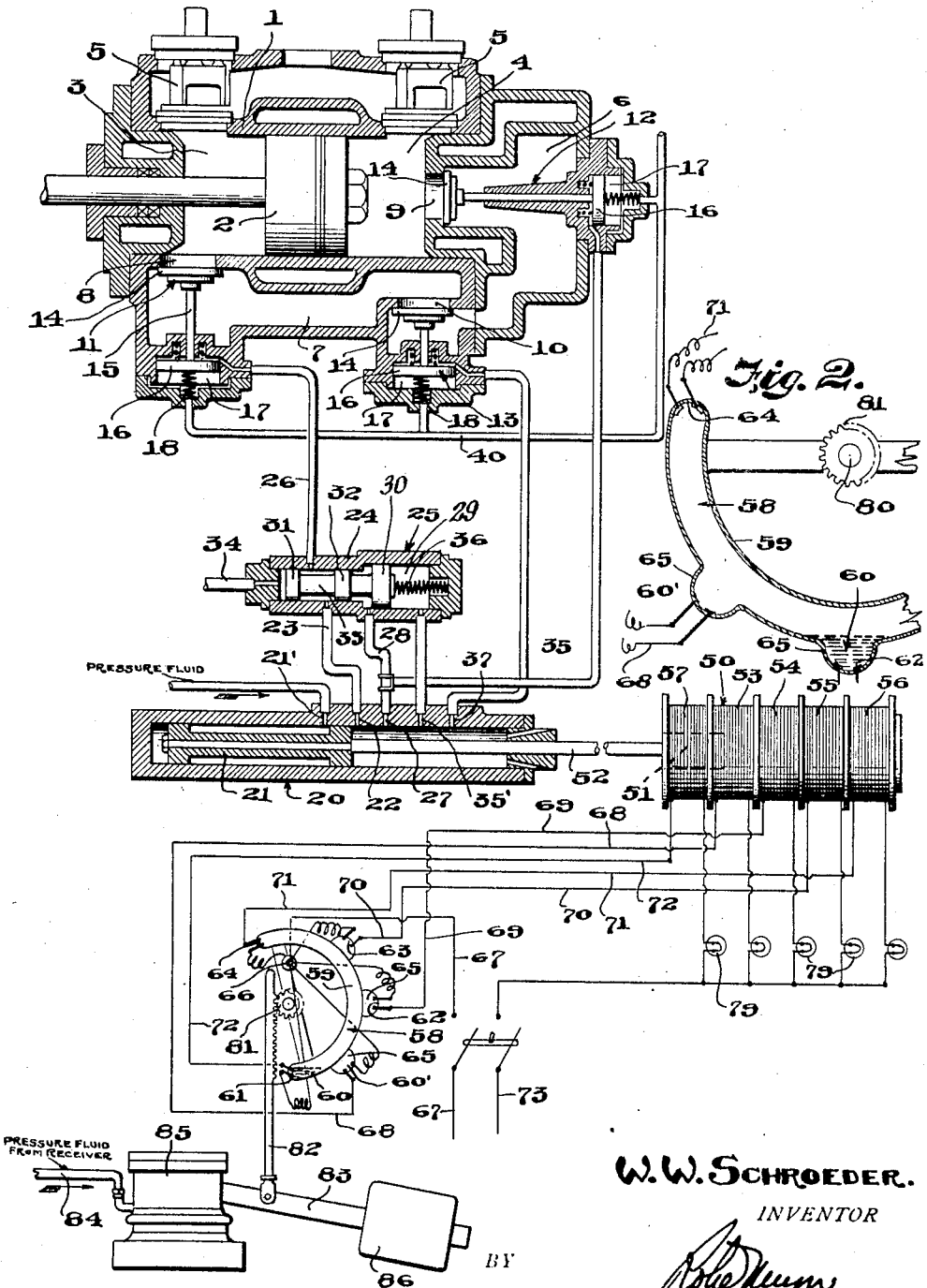
W. W. SCHROEDER.
INVENTOR
ATTORNEY Patented Mar. 17, 1936

2,034,272

UNITED STATES PATENT OFFICE 2,034,272

CONTROL MECHANISM FOR VARIABLE VOLUME COMPRESSORS

Walter W. Schroeder, Newark, N. J., assignor to Worthington Pump and Machinery Corporation, New York, N. Y., a corporation of Virginia Application August 7, 1930, Serial No. 473,687

7 Claims. (Cl. 137—139)

This invention relates to fluid compressors employed for compressing air, gas or analogous fluids and more particularly to a novel apparatus for regulating the unloading and loading of compressors gradually; that is, an automatic pressure regulator by means of which, the volume of fluid compressed is varied automatically with the demand for fluid so as to maintain practically constant pressure and obtain the resultant advantages in compressor operation.

Among such advantages are relatively low temperatures, resulting in relatively high efficiencies, reduced carbon deposits with the resulting improved valve action, improved lubrication and consequently less cylinder wear. These features are particularly marked should the compressor operate at low capacity and appreciably part of the time, such as most compressors are called upon to do.

In variable capacity compressors embodying the present invention, a series of control valves are employed, each acting to control a partial unloading of the compressor cylinder or cylinders, for varying the cylinder capacity in accordance with the movement of control valves operated and the required operation of these control valves is secured by a regulator, acting to vary the relative pressures tending to move these valves in opposite directions for loading or unloading the cylinders.

An object of the present invention is to provide a regulator or governor mechanism for controlling operation of said control valves, which is comparatively simple in construction, positive in operation and will eliminate any indecisive or hunting action and reversing movement during any individual operation in case of pressure variation before the individual operation is completed.

More specifically, the present invention comprises a pressure fluid distributor, which distributes the operating pressure fluid to the control valve and which is operated in step by step sequence by electrical means such as a solenoid or solenoids, the energizing of which is controlled by means responsive to pressure in the receiver in which the compressor discharges or by means responsive to predetermined pressures to control the capacity of the compressor in accordance with the demand for the fluid under pressure discharged by the compressor.

With these and other objects in view, as may appear from the accompanying specification, the invention consists of various features of construction and combination of parts, which will be first described in connection with the accompanying drawing, showing a control mechanism for variable volume compressors of the preferred form embodying the invention, and the features forming the invention will be specifically pointed out in the claims.

Fig. 1 is a diagrammatic view partly in section showing the improved control or regulator mechanism for variable volume compressors.

Fig. 2 is a fragmentary view in section through a switch structure embodied in the control or regulator apparatus.

Referring more particularly to the drawing, a double acting air or gas compressor is shown, which comprises the cylinder 1 in which the piston 2 reciprocates. The opposite ends of the cylinder, namely the head and crank ends 3 and 4 respectively, have approved types of inlet valves associated therewith for controlling the inlet of fluid into the cylinder 1 and as is usual in the construction of this type, clearance pockets 6 and 7 are provided for permitting variation of the volume of pressure fluid delivered by the compressor.

In Fig. 1 of the drawing, a particular arrangement of the clearance pockets is shown but it is to be understood that the present invention is not limited for use with compressors embodying this particular type of clearance and bypass arrangement but that it may be employed in connection with any of the improved compressor structures embodying various clearances and bypass arrangements for providing the volume control desired.

In the construction illustrated in Fig. 1 of the drawing, the clearance chamber 7 has communication through an opening 8 with the crank end 3 of the compressor cylinder, while the clearance chamber 6 has communication through an opening 9 with the head end 4 of the cylinder 1. The two clearance chambers 6 and 7 have communication with each other through an opening 10 to provide a bypassing arrangement for operating the compressor at zero capacity.

All of the openings 8, 9 and 10 are controlled by control valve structures 11, 12 and 13, all of which are alike in construction, comprising the valve discs 14, and the stems 15 which are connected to piston 16. The pistons 16 are mounted for reciprocatory movement in the cylinders 17 and the valve discs 14 are held seated by the springs 18 and pressure against the outer sides or faces of the pistons 16.

The unseating of the various valve discs 14 of the valves 11, 12 and 13 is controlled by the regulator embodying the present invention through the medium of a distributor valve structure 20.

The distributor valve 20 includes a reciprocatory valve piston 21, the reciprocation of which indirectly controls the operation of the unloading or loading control valves in the manner hereinafter described and this distributing valve piston 21 is in turn controlled in its operation by variation in the receiver pressure through the medium of the regulator mechanism embodying the present invention.

The improved regulator mechanism comprises a solenoid or solenoids 50, which may be a single solenoid embodying a plurality of individual coils as shown in the drawing or it may be individual solenoids as desired. However, the single solenoid embodying a plurality of individual coils tends toward simplicity in construction and it is so shown in the drawing and will be described herein as such type of solenoid.

The core 51 of the solenoid 50 is connected to the valve stem 52, which is in turn connected to the valve piston 21. The valve piston 21 is moved in step by step sequence either to the right or to the left, depending upon the energizing of the various coils 53, 54, 55, 56, or 57 of the solenoid 50.

A switch 58 is provided for controlling the energizing of the various coils of the solenoid and this switch comprises in its preferred form an arcuate tubular body constructed of any suitable insulating material.

The arcuate tubular switch body 59 has a movable circuit closing medium such as a slug of mercury indicated at 60 therein. This movable liquid circuit closer 60 is adapted to bridge any one of the plurality of sets or pairs of spaced contacts carried by the body 59. The pairs of contacts are spaced along the length of the arcuate tubular body 59.

The spaced pair of contacts 61 and the spaced pair 64 are positioned at the ends of the arcuate tubular body 59, while the pairs 62 and 63 and 60' are spaced at predetermined intervals along the tube and extend into pockets 65 adapted to receive the slug of liquid 60 for bridging the contacts of the respective pairs.

One of the contacts of each pair of contacts is connected through a suitable connector 66 with a line wire 67 of the supply line of electrical current to the apparatus. The other contacts of each of the pairs of contacts are connected by suitable wiring with the respective coils of the solenoid 50, for example, one of the contacts of the pair of contacts 60' is connected to the coil 53 through the medium of the wire 68. One of the contacts of the pair of contacts 62 is connected by the wire 69 to the coil 54, while the proper contacts of the pairs of contacts 63, 64 and 61 are connected by wires 70, 71 and 72 with the coils 55, 56 and 57 respectively of the solenoid 50.

The various coils of the solenoid 50 are connected to the wire 73 of the electric current supply line by suitable wires so that when any pair of the contacts are bridged by the liquid circuit closer 60, a corresponding coil of the solenoid 50 will be energized for drawing the core 51 thereinto and moving the valve piston 21 correspondingly. Visible signals 79 are connected in the circuit with the solenoid coils and they are operated upon the energizing of the coils so that the particular coil energized may be readily determined and consequently the loaded or unloaded condition of the compressor may be readily determined by viewing this visible signal.

The arcuate tubular body 59 is rockably mounted upon a suitable trunnion 80 and it has a pinion 81 connected thereto which meshes with the teeth of the rack bar 82. The rack 82 is connected to the weighted lever 83 of the pressure actuated structure 85, which receives fluid under pressure through the pipe 84. The structure 85 is of any approved type, such as illustrated and described in prior Patents #1,579,782 and #1,579,781 and the lever 83 is raised upon pressure increase and lowered through the medium of the weight 86 by pressure decrease. The pressure fluid entering the pressure operated structure 85 through the pipe 84 is preferably pressure fluid from the receiver (not shown) into which the compressor structure discharges.

In operation; when the pressure in the receiver (not shown) reaches a predetermined degree, the lever 83 will be moved and move the rack 82, which in turn will rock the arcuate tubular body 59 into such position that the liquid circuit closer 60 will bridge the contacts of the pair of contacts 60', which will close the circuit through the coil 53 of the solenoid 50 and move the core 51 one step or sufficient distance to open the fluid inlet 21' to the port 22. Fluid under any desired pressure is delivered into the distributor valve cylinder through the port 21', so that when the piston 21 is moved by the energizing of the coil 53 of the solenoid, this fluid under pressure will pass through the port 22 and pipe 23, into the cylinder 24 of the intermediate valve structure 25 and through the cylinder 24 and pipe 26 into the cylinder 17 of the pressure operated unloading device 11. Said pressure fluid entering the cylinder 17 inwardly of the piston 16 will force the piston 16 outwardly and unseat the valve disc 14. This opens the crank end 3 of the cylinder 1 to the clearance chamber 7 and permits one half unloading of the crank and of the cylinder and consequent operation of the compressor at 75% of its capacity.

Upon a further increase in receiver pressure, the arcuate tubular body 59 will be moved or rocked so as to bring the liquid contact closing medium 60 into the pocket 65 for bridging the contacts of the pair 62. This will energize the coil 54 of the solenoid 50 and move the valve piston 21 a further step, opening the port 21' to the port 27. The fluid under pressure passes from the port 27 through the pipe 28 into the enlarged portion 29 of the cylinder 24 and acts on the piston 30 of the intermediate valve structure, 25. Owing to the increased area of the piston 30 over the piston sections 31 and 32 of the valve 25, this pressure fluid will move the plunger comprising the pistons 30, 31 and 32 so as to cut off communication between the pipes 23 and 26 and permit the fluid under pressure, which is in the cylinder 17 to bleed therefrom through the exhaust pipe 34 of the intermediate valve structure 25. The port 27 also has a pipe 35 connected thereto so that at the same time, that the pressure fluid is admitted into the enlarged portion 29, the fluid will be admitted to the cylinder 17 of the unloading mechanism 12 in back of the piston 16 thereof and move the piston to unseat the valve disc 14 for opening the head end 4 of the cylinder 1 to the clearance chamber 6. The capacity of the clearance chamber 6 is such that this operation wholly unloads the head end of the cylinder and permits the compressor to operate at 50% of its full capacity since when the pressure fluid is permitted to exhaust from the cylinder 17 of the unloading mechanism 11. The pressure back of the piston thereof will seat the valve disc 14 and cut off communication between the crank end 3 of the cylinder and the clearance chamber 7.

Upon further increase of receiver pressure, the tubular switch body 59 is further moved so as to shift the liquid circuit closer 60 into engagement with the contacts of the pair 63, which energizes the coil 55 of the solenoid 50. The energizing of the coil 55 of the solenoid 50 moves the valve piston 21 an additional step to the right, which brings the port 35' into communication with the port 21' and permits the pressure fluid to enter the enlarged portion 29 of the cylinder 24 in front of the piston 30. Owing to the increased area of the outer side of the piston 30 over its inner side, the pressure fluid acting thereon together with the pressure applied by the spring 36, will force the plunger 33, which comprises the pistons 30, 31 and 32 to the left, in the drawing, and again open communication between the pipes 23 and 26 to permit pressure fluid to be admitted to the cylinder 17 of the unloading device 11 in front of the piston 16 thereof to unseat the valve disc 14 and again open the crank end 3 of the cylinder to the clearance chamber 7, providing a reversed step in the unloading operation of the compressor. At this time, the valve disc 14 of the unloading mechanism 12 will be held unseated through admittance of pressure fluid to the unloading mechanism through the pipe 35 and thus the head end 4 of the cylinder 1 will be wholly unseated and the crank end 3 will be unloaded 50%, which will permit the compressor to operate at 25% of its capacity.

Upon a further increase of receiver pressure, the tubular body 59 will be further rocked to bring the liquid circuit closer medium 60 into bridging engagement with the contacts of the pair 64, which will energize the coil 56 of the solenoid 50 and move the valve piston 21 to its furthermost limit to the right and open the port 37 to receive fluid under pressure from the port 21'. The fluid under pressure passing through the port 37 will enter the cylinder 17 of the unloading mechanism 13 and move the piston 16 thereof to unseat its corresponding valve disc 14, which opens the head end 4 of the cylinder through the clearance chamber 6 and clearance chamber 7 to the crank end 3 of the cylinder and permits the by-passing of the fluid compressed by the reciprocation of the piston 2 and consequently wholly unloads both ends of the cylinder and permits the compressor to operate at zero capacity.

Decrease in receiver pressure reverses the operation above described, the compressor being loaded in a graduated manner in the same portion as that in which it is unloaded; i. e., upon decrease in receiver pressure the pressure is relieved in the mechanism 85 and the lever allowed to rock the tubular body 59 in a reverse direction and deenergize the coil 56 and energizes the coil 55 of the solenoid 50 for moving the valve piston 21 in a reverse direction, or to the left, one step which will cut off the port 37 from the port 21', relieving the pressure in back of the piston 16 of the unloading mechanism 13 to permit the pressure fluid to bleed from the cylinder 17 out through the exhaust 34 and allow the valve 14 to be seated by the pressure of the spring 18 and pressure fluid in front of the piston 16 through the pipe 40, thus cutting off the by-pass communication between the head end 4 and crank end 3 of the compressor and causes the compressor to operate at 25% of its maximum capacity.

The various steps heretofore described, are repeated in a reverse direction until the compressor is operating at 75% of its capacity and then upon a further decrease in receiver pressure, the tubular body 59 is rocked to its furtherest limit to the right and the lower end of the liquid circuit closing medium 60 is brought into bridging engagement with the contacts of the pair 61. This closes the circuit through the coil 57 of the solenoid 50, which moves the valve piston 21 and cuts off all of the ports 22, 27, 35 and 37 from communication with the port 21' and consequently cuts off the delivery of pressure fluid to all of the unloading mechanisms, permitting the various valve discs 14 thereof to be seated and closes both the head end 4 and the crank end 3 of the compressor from any communication with any of the clearance pockets and consequently, the compressor operates at full or 100% capacity.

It will be understood that the invention is not to be limited to the specific construction or arrangement of parts shown but that they may be widely modified within the invention defined by the claims.

What is claimed is:

1. In combination, a distributor valve including a cylinder having a plurality of pressure fluid ports for selectively delivering pressure fluid, a piston controlling said ports, a plurality of independent solenoid coils, a solenoid core connected to said piston whereby energizing of the respective solenoid coils will move said piston in corresponding port controlling positions.

2. In combination, a distributor valve including a cylinder having a plurality of pressure fluid ports for selectively delivering pressure fluid, a piston controlling said ports, a plurality of independent solenoid coils, a solenoid core connected to said piston whereby energizing of the respective solenoid coils will move said piston in corresponding port controlling positions, a selective switch controlling energizing of said solenoid coils, and means operated by pressure of fluid compressed for operating said selective switch.

3. In combination, a distributor valve including a cylinder having a plurality of pressure fluid ports for selectively delivering pressure fluid, a piston controlling said ports, a plurality of independent solenoid coils, a solenoid core connected to said piston whereby energizing of the respective solenoid coils will move said piston in corresponding port controlling positions, a mercury tube switch selectively controlling energizing of said solenoid coils, and pressure operated means for operating said selective switch.

4. In combination, a distributor valve including a cylinder having a plurality of pressure fluid ports for selectively delivering pressure fluid, a piston controlling said ports, a plurality of independent solenoid coils, a solenoid core connected to said piston whereby energizing of the respective solenoid coils will move said piston in corresponding port controlling positions, and means whereby said coils may be energized in succession or in irregular sequence.

5. In combination, a distributor valve including a cylinder having a plurality of pressure fluid ports for selectively delivering pressure fluid, a piston controlling said ports, electrical means for moving said piston in port controlling positions, and a selective switch controlling energizing of said electrical means.

6. In combination, a distributor valve including a cylinder having a plurality of pressure fluid ports for selectively delivering pressure fluid, a piston controlling said ports, electrical means for moving said piston in port controlling positions, and a selective switch controlling energizing of said electrical means, and pressure operated means for operating said selective switch.

7. In combination, a distributor valve including a cylinder having a plurality of pressure fluid ports for selectively delivering pressure fluid, a piston controlling said ports, a plurality of independent solenoid coils, a solenoid coil connected to said piston whereby energizing of the respective solenoid coils will move said piston in corresponding port controlling positions, a selective switch energizing of said solenoid coils and means for operating said selective switch whereby said coils may be energized in succession or irregular sequence.

WALTER W. SCHROEDER.